US012679543B2

(12) United States Patent　　(10) Patent No.:　US 12,679,543 B2
Veneruso　　　　　　　　　　　 (45) Date of Patent:　　　Jul. 14, 2026

(54) RECLINING SEAT

(71) Applicant: GEVEN S.P.A., Nola (IT)

(72) Inventor: Alberto Veneruso, Nola (IT)

(73) Assignee: GEVAN S.P.A., Nola (IT)

( * ) Notice: Subject to any disclaimer, the term of this patent is extended or adjusted under 35 U.S.C. 154(b) by 88 days.

(21) Appl. No.: 18/208,493

(22) Filed: Jun. 12, 2023

(65) Prior Publication Data

US 2024/0150021 A1　　May 9, 2024

(30) Foreign Application Priority Data

Jun. 13, 2022　　(IT) ........................ 102022000012452

(51) Int. Cl.
　　B64D 11/06　　　(2006.01)
　　B60N 2/22　　　 (2006.01)
(52) U.S. Cl.
　　CPC .......... B64D 11/064 (2014.12); B60N 2/2227 (2013.01)
(58) Field of Classification Search
　　CPC ................................................... B64D 11/064
　　See application file for complete search history.

(56) References Cited

U.S. PATENT DOCUMENTS

| | | | | |
|---|---|---|---|---|
| 4,004,836 | A * | 1/1977 | Kristensson | ........... A61G 5/006 |
| | | | | 297/301.2 |
| 5,779,312 | A * | 7/1998 | Nagai | .................... B60N 2/231 |
| | | | | 297/362.13 |

| | | | | |
|---|---|---|---|---|
| 6,644,738 | B2 * | 11/2003 | Williamson | ....... B64D 11/0638 |
| | | | | 297/216.2 |
| 6,688,694 | B1 * | 2/2004 | Yu | .......................... A47C 1/026 |
| | | | | 297/354.13 |
| 7,182,402 | B1 * | 2/2007 | Ahad | ................... B64D 11/064 |
| | | | | 297/354.12 |
| 7,726,607 | B2 * | 6/2010 | Schumacher | ............ B60N 2/22 |
| | | | | 297/335 |
| 7,866,752 | B1 | 1/2011 | Heuser et al. | |
| 9,764,844 | B2 * | 9/2017 | Le | ..................... B64D 11/0647 |
| 10,144,515 | B2 * | 12/2018 | Le | ........................... B60N 2/85 |
| 2004/0051363 | A1 | 3/2004 | Wagner et al. | |
| 2008/0169694 | A1 * | 7/2008 | Speh | .................... B64D 11/064 |
| | | | | 297/300.1 |
| 2011/0148167 | A1 * | 6/2011 | Westerink | ........... B64D 11/064 |
| | | | | 297/354.12 |
| 2013/0038103 | A1 * | 2/2013 | Scott | ................... B60N 2/3025 |
| | | | | 297/248 |

(Continued)

FOREIGN PATENT DOCUMENTS

| | | |
|---|---|---|
| EP | 1234530 A1 | 8/2002 |
| WO | 02066283 A1 | 8/2002 |
| WO | 2005066023 A2 | 7/2005 |

*Primary Examiner* — Timothy J Brindley
(74) *Attorney, Agent, or Firm* — Volpe Koenig

(57)　　　　　　ABSTRACT

A reclining seat comprises a fixed supporting frame, a reclining backrest, and a damping device providing, at lower ends of frame elements forming the seat frame, a lever which is revolvingly hinged on a respective pin integral to the supporting frame and which forms a rocker arm which rotates by a prefixed angle from a first position, corresponding to the reclining backrest in erected position, to a second position, corresponding to the reclining backrest in reclined position, a hydraulic cylinder being provided, with respective fastening ends revolvingly connected respectively to said second lever and to the fixed supporting frame in a prefixed position.

10 Claims, 4 Drawing Sheets

(56)                   References Cited

U.S. PATENT DOCUMENTS

2016/0297533  A1     10/2016  Le et al.
2020/0307419  A1 *   10/2020  Finlay ................. B64D 11/064
2021/0179274  A1 *    6/2021  Lueck ............... B64D 11/0696
2021/0316865  A1 *   10/2021  Lasell ................. B64D 11/064

* cited by examiner

RECLINING SEAT

FIELD OF THE INVENTION

The present invention relates to a seat provided with a reclining backrest, mentioned in short as reclining seat, in particular of the type adapted to be formed on a fastening structure connecting it stably to a floor, and which in case can be arranged on parallel rows of seats adjacent therebetween, for example on board vehicles such as aircrafts, trains or vehicles on the road, which are all connected to the same fastening structure; the reclining seat, apart from the backrest, has also a fixed supporting frame, which partially consists of said fastening structure, and a sitting portion.

CONTEXT OF THE INVENTION

As it is known, especially in the aeronautical field, the seats reserved for passengers must meet, on one side, strict safety standards and, on the other side, the needs requiring a reduced weight but, in any case, they have to provide even a certain level of performances, in particular in terms of comfort.

The reclining seats, the present invention relates to, include a backrest consisting of a backrest frame which can have a substantially parallelepiped shape and which has vertical bar elements which define the side profile and the headrest thereof, and which are joined to the fixed supporting frame in order to be able to be reclined and brought back in erected position. On the backrest frame a padded coating of flexible type or other components, completing and making functional the reclining backrest, can be then mounted.

In order to recline the backrest, the user generally acts by sitting on the seating portion and by resting the back to the backrest itself, by exerting a pressure thereon. At the same time, he/she presses a button which deactivates a device locking the backrest, and exerts with his/her back a force backwards which opposes to an elastic force which tends to bring the backrest back in an erected position.

However, the backrest motion has to be smooth and without jumps and then systems for braking such motion can be provided, such as clutches arranged on the joints, which however are subject to wear and can cause the locking of the backrest itself.

Even hydraulic cylinders to attenuate the backrest motion were proposed which exploit the friction between one piston in a cylinder and a fluid inside the cylinder, but the insertion and the fastening of this type of mechanical element, to operate at best, needs to work on an excursion of a certain extent which, in case of backrests reclining by a very limited angle, is difficult to obtain. Moreover, subordinately, the use of a hydraulic cylinder in a seat has to allow a use flexibility suitable to the purpose, not limited by fixed hooks in the frame of the seat itself.

International patent application No. WO 02/066,283 A1 describes an aeronautical seat with reclining backrest, provided with a stiffening mechanism comprising an actuator arranged below the sitting portion, and acting on the frame ends of the backrest; but such mechanism has an overall dimension and weight which could result to be excessive in the transport field.

SUMMARY OF THE INVENTION

The technical problem underlying the present invention is to provide a reclining seat allowing to obviate the drawback mentioned with reference to the known art.

Such problem is solved by a seat as specified in the preamble, which comprises a damping device having, at least at a lower end of a backrest frame element, a lever joined thereto, which can rotate around an axis implemented by a pin forming a respective hinge integral to the fixed supporting frame, and which implements a rocker arm, projecting from said hinge, which rotates by a prefixed angle from a first position, corresponding to the reclining backrest in erected position, to a second position corresponding to the reclining backrest in reclined position.

The damping device uses at least a hydraulic cylinder with respective fastening ends revolvingly connected respectively with the rocker arm and to the fixed supporting frame in a prefixed position.

The main advantage of the reclining seat according to the present invention lies in the fact of allowing the hydraulic cylinder to work under optimum conditions, with minimum overall dimensions.

BRIEF DESCRIPTION OF THE DRAWINGS

The present invention will be described hereinafter according to a preferred embodiment example, provided by way of example and not with limiting purposes, of a reclining seat of aeronautical type and with reference to the enclosed drawings wherein.

DESCRIPTION OF PREFERRED EMBODIMENT EXAMPLES OF THE INVENTION

Figure 1:
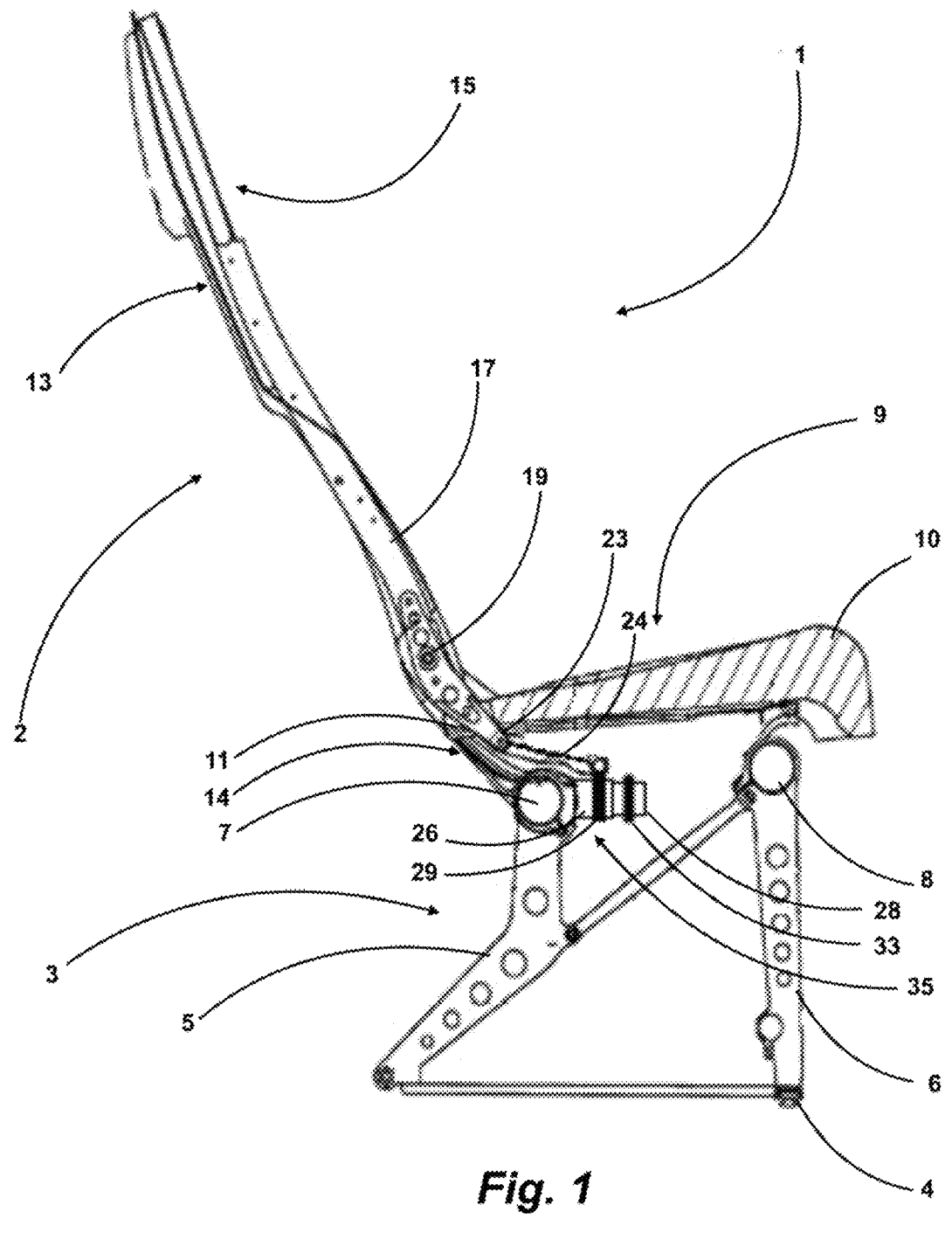
FIG. 1 shows a section view of a reclining seat according to a first embodiment example of the present invention, in a respective row of seats.

With reference to FIG. 1, a row of the reclining seats is shown in cross section, by highlighting a reclining seat of a first example of the present invention, designated as a whole with 1. The row can include a variable number of the reclining seats, or can consist of one single seat; the seats composing the row can be reclined independently from one another. Such row is arranged to be positioned in a series of subsequent rows, parallel to each other, each one forming a space, between itself and the row positioned frontally, which is used by the users to access the seats 1 and to raise therefrom.

This type of seat in particular is an aeronautical seat, installed on board aircrafts, but it is meant that the invention generally relates to any type of seat which can be installed on board any vehicle, such as trains or buses, or even in other contexts, such as stadiums, cinema halls, conference halls and so on.

Each reclining seat 1 comprises a reclining backrest 2 and a supporting frame which, in the present example, is constrained to the aircraft floor.

In particular, the fixed supporting frame of each reclining seat 1 consists of a fastening structure 3 provided to connect all seats of a row to specific anchoring means 4 implemented in the aircraft's floor. The fastening structure comprises rear uprights 5 and front uprights 6, which have respective upper ends which are connected respectively by a first rear cross bar 7 and by second front cross bar 8, both of them supported at a certain distance from the ground, to provide a supporting base to the reclining seat.

The two cross bars 7, 8 are tubular, that is they are implemented by stiff tubular elements extending horizontally by anchoring all seats of the row at a prefixed height. In particular, the tubular elements have a cylindrical and smooth external surface.

At each seat 1, the fastening structure 3 then comprises a pair of stiff connecting elements 20 which extend between the two bars 7, 8, by connecting them stiffly, and by delimiting a space in which the reclining seat 1 is contained.

In particular, the connecting elements 20 comprise respective frame stiff extensions 21 extending in substantially vertical, or slightly tilted, direction from the first cross bar 7, by delimiting a space wherein the reclining backrest 2 of each seat is comprised.

The connecting elements 20, with the frame stiff extensions 21, and the cross bar portions 7 and 8 comprised therebetween substantially constitute a fixed supporting frame of each reclining seat 1.

Moreover, the reclining seat 1 comprises a sitting portion 9 resting on said cross bars; it has a front sitting edge 10 and a rear sitting end 11.

The reclining backrest 2 has a backrest frame 13 having a substantially parallelepiped-like shape extending from a backrest lower end 14, arranged below the sitting portion 9, and a headrest 15, such shape being defined by the backrest frame 13 whereon a coating 16 is mounted.

The backrest frame 13 in particular comprises two vertical bar elements 17, which are arranged each one at a respective side edge of the backrest 2, extending from said backrest lower end 14 to a junction element implementing said headrest 15.

The two frame elements 17 are stiff and they have a slightly bent shape to form a resting intrados for a user's back. Each frame element 17 has a first joint 19, arranged near the backrest lower end 14, revolvingly connecting the backrest 2 to the respective frame stiff extensions 21, that is to the supporting frame formed in the fastening structure 3.

The frame elements 17 further comprise respective lower ends 22, which result to be positioned below the sitting portion and which are movable from a first prefixed position, corresponding to the backrest 2 in erected position, to a second prefixed position, corresponding to the backrest 2 in position reclined by the maximum angle allowed by the geometry of the reclining mechanism which is not herein described, but which can be of any type and allows possible intermediate positions between the two above-mentioned ones.

Figure 2:
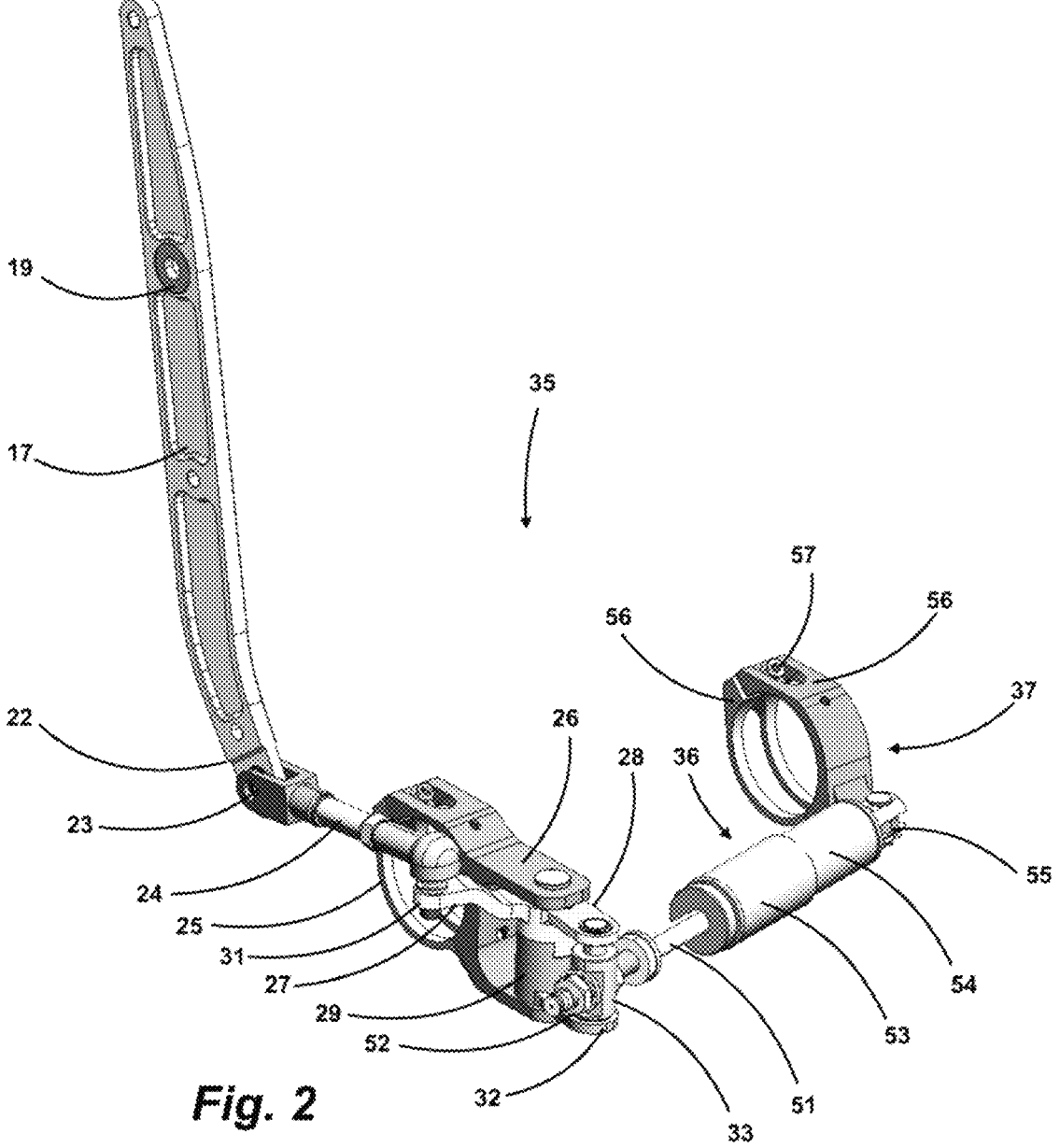
FIG. 2 shows an enlarged perspective view of a detail of the seat of FIG. 1.

Below the sitting portion 9, the reclining seat 1 comprises a damping device, designated as a whole with 35, which attenuates and slows down the swinging motions of the reclining backrest 2, and which will be described hereinafter, with reference to FIGS. 2 and 3.

The damping device 35 is associated to the supporting frame of the seat 1, that is to the fastening structure 3, and in particular to the first rear cross bar 7.

The damping device 35 is connected and acts on one lower end 22 of one of the frame elements 17, or in case on both of them.

At such end 22, a second joint 23 is implemented which is connected to a respective control arm 24 of the frame element 17.

Moreover, near the same end 22, the damping device 35 comprises a first collar 25 which is fastened to the cross bar

7 in an adjustable position, therefrom a fixed arm 26 having predetermined length extends horizontally.

Moreover, the damping device 35 comprises a lever 27 which is joined to said frame lower end 22 through said control arm 24, and which is revolvingly hinged with respect to the fixed supporting frame at a first pin 29 implementing a respective joint which, in this example, is arranged at the projecting end 30 of the above-mentioned fixed arm 26, so that such joint is at a prefixed distance from the first bar 7 of the frame.

The lever 27 forms a rocker arm 28 extending from said pin 29, the lever 27 and the rocker arm 28 being stiffly integral with one another and thus forming a stiff connection, in particular being implemented in one single piece.

The first pin 29 thus implements a respective hinge defining a respective rotation axis A which crosses, with its projections, the space comprised between the two cross bars 7, 8, and it is arranged at a certain distance, imposed by the arm 26, from the first rear cross bar 7.

In this respect, the lever 27 has a first distal end 31 revolvingly connected to said second joint 23 of the control arm 24, thus implementing a kinematic connection joined between frame element 17 of the backrest 2 and the damping device 35.

Because of this mechanism, the rocker arm 28 rotates by a prefixed angle from a first position, corresponding to the reclining backrest 2 in erected position, to a second position, corresponding to the reclining backrest 2 in reclined position.

This rotation has a prefixed rotation angle, the width thereof is determined by the translation of the control arm 24, that is by the excursion of the respective lower end 22 when the backrest is moved from an erected position to a reclined position, positions which will be determined by suitable stops.

The first pin 29 thus implements a respective hinge and the damping device 35 then comprises a hinge having a rotation axis crossing, with its positions, the space comprised between the two cross bars 7, 8, and it is arranged at a certain distance, imposed by the arm 26, from the rear cross bar 7.

Because of this mechanism, the rocker arm 28 rotates by a prefixed angle from a first position, corresponding to the reclining backrest 2 in erected position, to a second position, corresponding to the reclining backrest 2 in reclined position.

This rotation has a prefixed rotation axis, the width thereof is determined by the translation of the control arms 24, that is by the excursion of the lower ends 22 when the backrest is moved from an erected position to a reclined position, positions which will be determined by suitable stops.

It will be noted that the excursion of the lever 28 in particular could be wider than the limited excursion of the frame lower end 22, since such end is at a reduced distance from the first joint 19 of the backrest frame 13, and since the angular excursion of the reclining backrest 2 itself will be however reduced.

The rocker arm 28 has a respective second distal end 32 comprising a second pin 33 of hinge, still with substantially vertical axis, that is parallel to the one defined by the first pin 29.

The second pin 33 has a fastening cross hole wherein a first fastening end 51 of a hydraulic cylinder 36 is inserted; the first fastening end 51 has a threaded rod section inserted in said cross hole, and an adjusting nut 52 allowing both to adjust precisely, with respect to a counterpart nut, the position of this end 51 with respect to the hinge thereto it is hinged, and to assemble and disassemble easily the hydraulic cylinder 36 from its seat.

The hydraulic cylinder 36 then comprises an external tubular casing 53, with cylindrical shape, and a piston 54, tubular too, inserted with a telescopic relation in the open end of the tubular casing 52.

The hydraulic cylinder 36 is filled-up with a fluid implementing a strong friction due to the motion of the piston 54 in the casing 53, with a braking and damping effect which is capable of attenuating the motion of the reclining backrest 2, by making it smooth and without jumps.

The piston 54 comprises a stem 55, formed too by a rod, actuating as respective second fastening end.

The hydraulic cylinder 36, since it is fastened at one end thereof to a movable element controlled by the excursion of one of the two frame lower ends 22, at the opposite end should have to be fastened to a fixed portion, that is to the supporting frame of seat 1, that is to its fastening structure 3. In particular, it could be fastened to one of the cross bars 7, 8, advantageously in an adjustable position along them.

Preferably, in order to obtain an even more reduced overall dimension, this end will be fastened to the first rear cross bar 7, that is the one proximate to the frame lower ends 22 of the backrest frame 13.

In this regard, on the rear cross bar 7 a second collar 37 is provided, in an intermediate position between the frame lower ends 22 of the backrest frame 13.

The second collar 37 has a tightening ring structure, with a pair of tightening ends 56 arranged facing to one another, surrounding completely the cross bar, and which can be tightened by acting on an adjustment screw 57 with a threaded nut, fastened in an adjustment hole crossing both tightening ends 56.

By acting with a screwdriver or with a key tool, it is then possible to adjust precisely the position of the second collar 37 with respect to the first collar 25, which instead is in a fixed position.

This allows, during assembly and maintenance of the seat 1, to assemble and disassemble easily the damping device 35, in case by replacing only the worn hydraulic cylinder with a simple maintenance procedure, or by adjusting the position of the second collar 37 to make the motion of the reclining backrest more damped, by adapting it to the performances of the hydraulic cylinder 36.

Moreover, during the in-series manufacturing of reclining seats, the adoption of the above-described damping device allows to use the extended portions for seats with different sizes, requiring only different hydraulic cylinders, and which could be assembled with the same assembly procedures and with the same mechanical portions used for other seats.

It is meant that the damping device 35 could even be implemented by two specular structures, then with two independent hydraulic cylinders 36, each structure acting on a respective frame lower end 22.

The hydraulic cylinder 36 could be of the elastic return type; in particular it could contain inside thereof a spring arranged to make the hydraulic cylinder 36, in absence of stresses onto the backrest, to go back from an extended configuration, corresponding to the reclined seat, to a retracted configuration, corresponding to the seat in erected position, or vice versa.

Otherwise, the elastic return of the seat in erected position, when it is released in absence of other stresses, by other elastic elements, in particular acting on the first joints 19 of the backrest frame 13.

Another solution may provide that a return elastic element is inserted in the pin(s) 29 of the vertical-axis hinge associated to the damping device 35.

At last, one could note that even the above-described first collar 25 could have a tightening-ring structure like the one described for the second collar 37, thus by guaranteeing a greater flexibility in its position during the step of assembling the seat and during maintenance.

In the present embodiment example, the above-described damping device 35 is coupled to a stiffening mechanism 12 of the reclining backrest 2, having the function of preventing the torsion of the backrest frame 13.

In fact, should the backrest 2 be stressed by the user with an asymmetrical force, the two frame elements 17 would tend to rotate relative to each other, by causing a tension effort of the backrest 2 which would affect its joints.

However, it is meant that this combination with the stiffening mechanism 12 is optional, since the damping device 35 can be adopted in a reclining seat even without providing any stiffening mechanism, or with a stiffening mechanism of different nature.

In this example, in order to implement said stiffening mechanism 12, the mechanical portions which have been described with reference to the damping device 35 and to one single lower end 22 are present even at the other lower end 22, with a functionally specular arrangement.

Therefore, on the opposite side of the seat another first collar 25 is provided, fastened to the bar 7, with a fixed arm 26 extending horizontally with predetermined length, in direction of the second cross bar 8; even another control arm 24, a lever 27 and a rocker arm 28 with another first pin 29 and another second pin 33 are provided, according to what described previously.

Even in this case, the lever 27 and the rocker arm 28 thus rotate from a first position, corresponding to the backrest 2 in erected position, to a second position, corresponding to the backrest 2 in reclined position.

However, it will be noted that the position of the first pins 29 with respect to the respective frame lower ends 22 will be selected to have opposite rotation directions.

Figure 3:
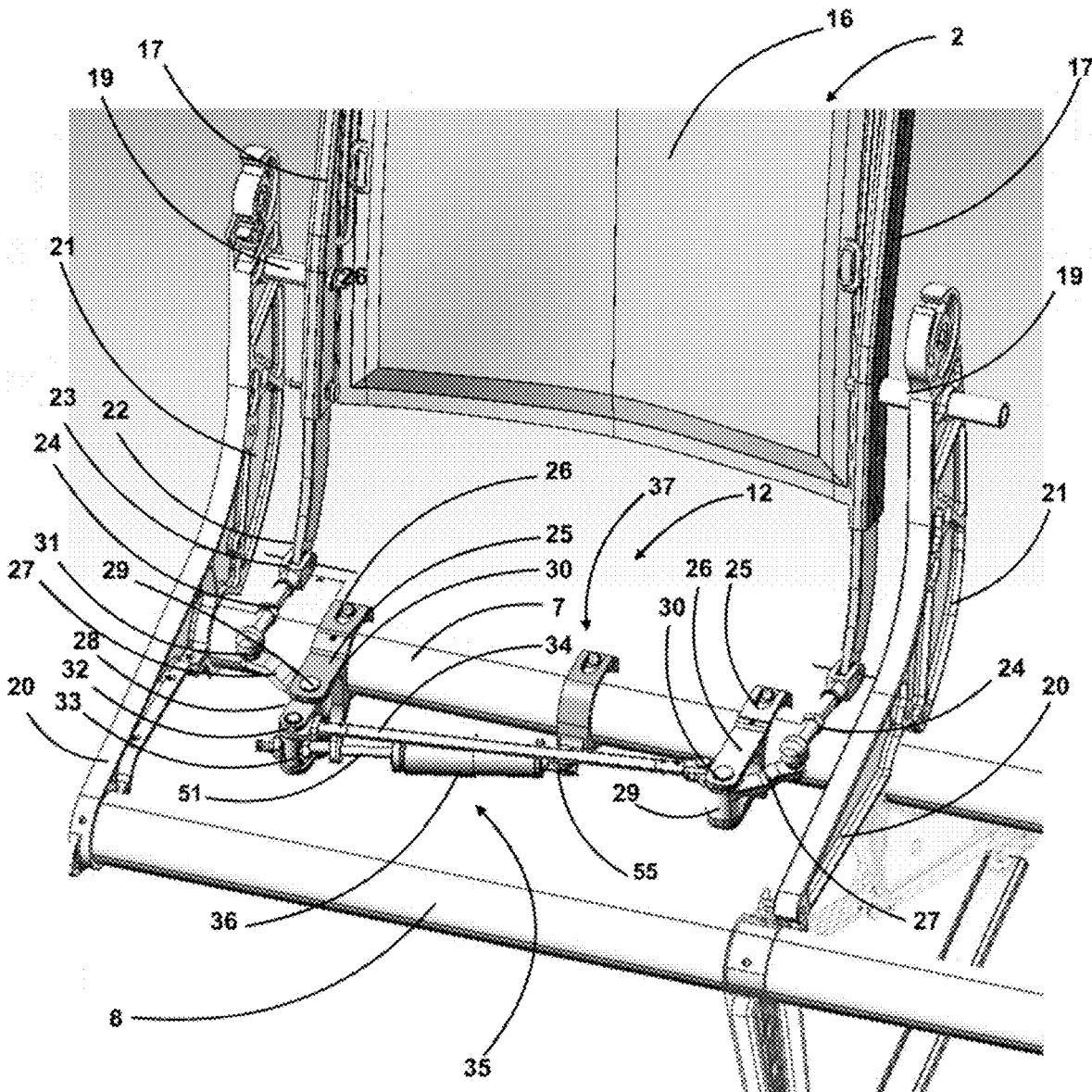
FIG. 3 shows a front and partial perspective view of a seat of FIG. 1, in cross section.

Upon looking at FIG. 3 from left to right, the first pins 29 of the present example thus will rotate one in counterclockwise direction, and the other one in clockwise direction, and vice versa.

In order to implement the stiffening mechanism, the second pins 33 of said rocker arms 28 are revolvingly connected therebetween at the opposite ends of a stiff tie-rod 34, implemented by a stiff rod with a predetermined length so that the stiff tie-rod 34 is substantially joined to the respective second distal ends 32 of said rocker arms 28.

Thanks to this mechanism, the rotation of a lever 27 and of the respective rocker arm 28 causes a rotation of the other lever 27 and of the other respective rocker arm 28, and vice versa, by an angle having the same width, and in this way the frame elements 17 of the backrest frame 13 move always synchronously, without determining any torsion in the backrest frame 13.

Even in this case, the greater width of this angle with respect to the one produced by the excursion of the frame lower ends 22 improves also the performance of the stiffening mechanism 12.

Moreover, this arrangement of the stiffening mechanism 12 and/or of the damping device 35 allows to empty the space below the sitting portion 9, since both the stiffening mechanism 12 and the damping device 35 are associated to the first cross bar 7, the rear one.

Figure 4:
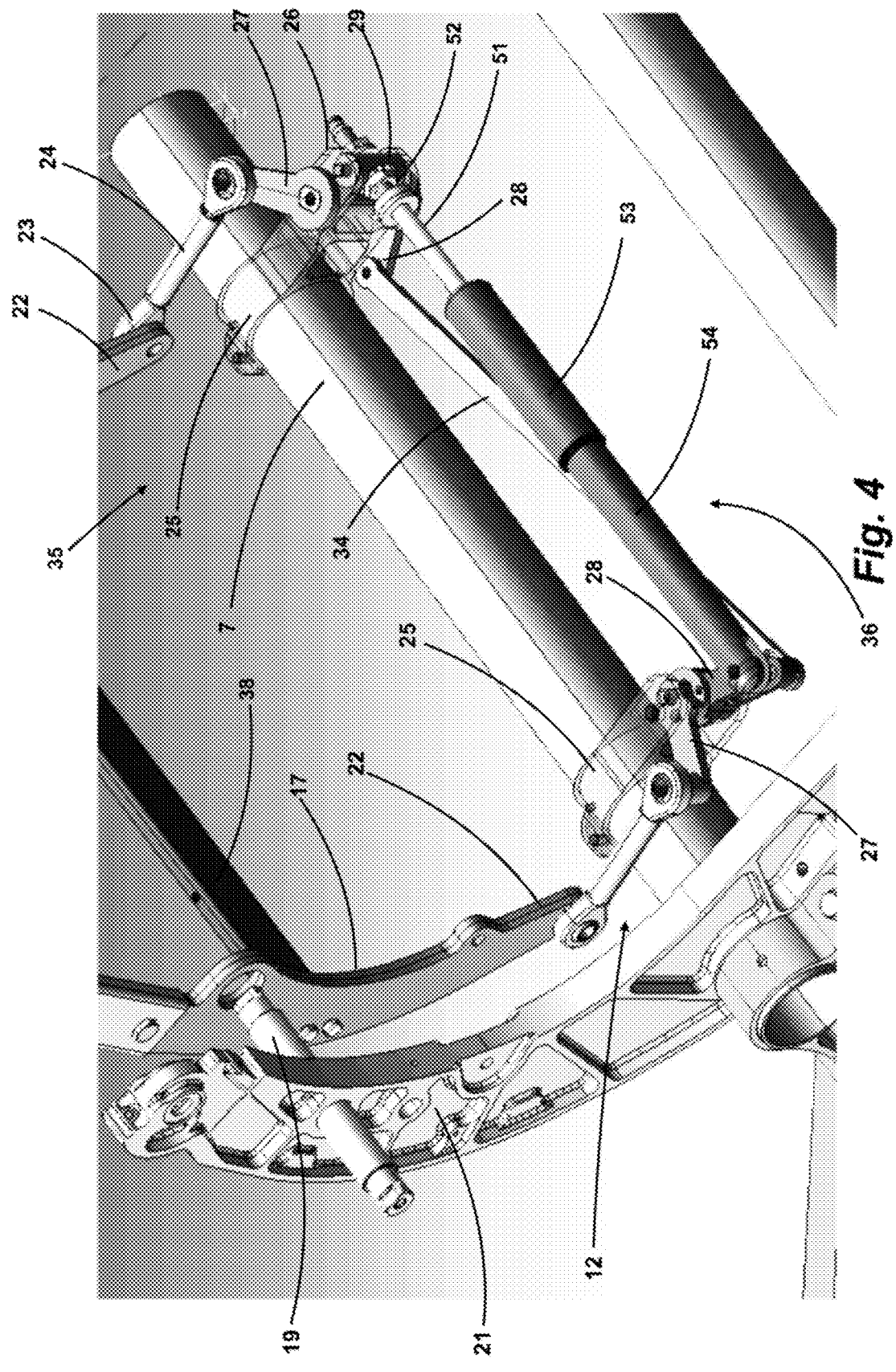
FIG. 4 shows a front and partial perspective view of a seat of a second embodiment example of the present invention, in cross section.

With reference to FIG. 4, in a second embodiment example of the present seat, the two vertical bar elements, each one arranged on opposite sides of the backrest 2, have a cross connection bar 38 connecting them stiffly near the frame lower ends 22. This connection can attenuate the torsion thereto the backrest frame 13 could be subjected, however it does not remove it.

Moreover, in the damping device 35, the hydraulic cylinder 36 of the damping device 35, instead of being connected to the second collar 37, is always connected to a section of the first cross bar 7, at a distance from the lower end 22 of frame whereon it acts so as to allow to insert the hydraulic cylinder 36.

In this particular case, the hydraulic cylinder 36 is connected to the first pin 29 which has a fastening hole for a first fastening end 51 which, in this way, is constrained in a fixed position and not in a movable position, as described for the preceding embodiment example.

Therefore, the position of the hydraulic cylinder in this example will be reversed with respect to the preceding one: the second fastening end will be constrained to the second pin 33 of the rocker arm 28. In this way, the hydraulic cylinder of the damper 36 can have a greater extension.

To the above-described reclining seat a person skilled in the art, with the purpose of satisfying additional and contingent needs, could introduce several additional modifications and variants, all however comprised within the protective scope of the present invention, as defined by the enclosed claims.

The invention claimed is:

1. A reclining seat comprising:
a fixed supporting frame;
a sitting portion;
a reclining backrest having a backrest frame with two vertical frame elements, arranged each one at a respective side edge of the reclining backrest, and each one thereof being provided with a joint, revolvingly connecting the reclining backrest to the fixed supporting frame, and a respective lower end movable between positions depending upon an erected or reclined state of the reclining backrest;
a damping device comprising, at least at one lower end, a respective lever joined thereto, which is revolvingly hinged, with respect to the fixed supporting frame, around a pin forming a respective hinge integral with the fixed supporting frame, said respective lever implementing a rocker arm, projecting from said hinge, the lever and the rocker arm being stiffly integral with each other, the rocker arm rotating by a pre-fixed angle from a first position, corresponding to the reclining backrest in erected position, to a second position, corresponding to the reclining backrest in reclined position, a hydraulic cylinder being provided, with respective fastening ends revolvingly connected respectively to the rocker arm and to the fixed supporting frame in a prefixed position;
wherein said hydraulic cylinder is fastened to said rocker arm at a respective additional end pin acting as hinge, the additional pin having a fastening cross hole in which a first fastening end of the hydraulic cylinder is inserted, with a tract of threaded rod inserted in a respective cross hole, and an adjusting nut allowing an adjustment with respect to a counterpart.

2. The reclining seat according to claim 1, wherein said pin implements a hinge with substantially vertical rotation axis.

3. The reclining seat according to claim 1, wherein the fixed supporting frame comprises a pair of horizontal bars, transversal to the seat, arranged on uprights, said hydraulic cylinder being anchored to one of said bars by means of a tightening ring positionable along such cross bar.

4. The reclining seat according to claim 3, wherein said hydraulic cylinder is anchored to the rear bar, at said frame ends.

5. The reclining seat according to claim 4, wherein said pin is positioned at a prefixed distance from said rear bar, on one arm projecting therefrom in direction of the other front bar.

6. The reclining seat according to claim 5, wherein said arm is connected to a respective tightening ring positionable along such rear cross bar.

7. The reclining seat according to claim 1, wherein in frame lower end a respective joint is implemented which is connected to a respective control arm which, at one end thereof, is joined to a distal end of said lever thus implementing a kinematic connection joined between frame element of the backrest frame and the damping device.

8. The reclining seat according to claim 1, wherein the hydraulic cylinder is of the elastic return type.

9. The reclining seat according to claim 1, wherein the damping device is coupled to a stiffening mechanism of the reclining backrest, having the function of preventing the torsion of the backrest frame.

10. The reclining seat according to claim 1, wherein the reclining seat is an aeronautical seat.

\* \* \* \* \*